F. B. LAWRENCE.
Manufacture of Stench-Traps.
No. 148,616. Patented March 17, 1874.
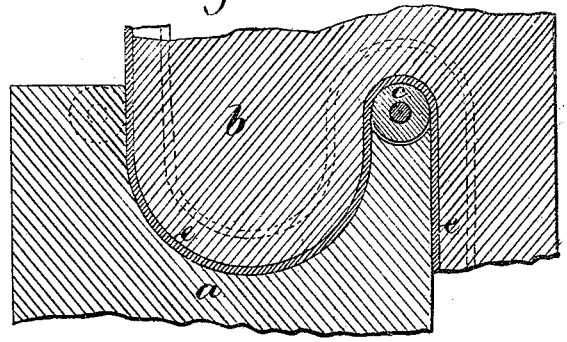
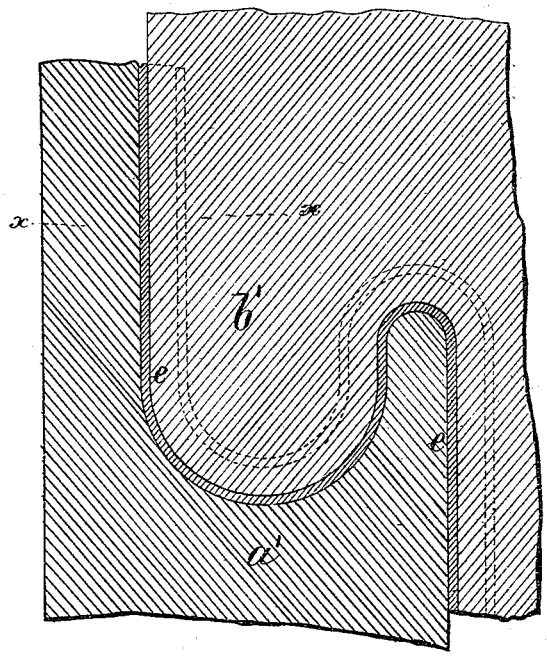
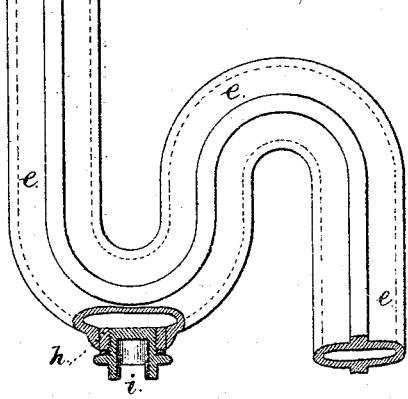
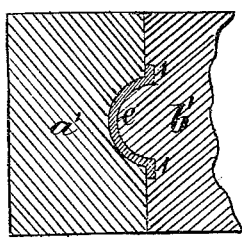
Inventor,
Frank B. Lawrence
per L. W. Serrell
atty.

UNITED STATES PATENT OFFICE.

FRANK B. LAWRENCE, OF PASSAIC, NEW JERSEY.

IMPROVEMENT IN THE MANUFACTURE OF STENCH-TRAPS.

Specification forming part of Letters Patent No. 148,616, dated March 17, 1874; application filed November 11, 1873.

*To all whom it may concern:*

Be it known that I, FRANK B. LAWRENCE, of Passaic, in the county of Passaic and State of New Jersey, have invented an Improvement in Traps for Water-Closets, &c., of which the following is a specification:

Lead traps have been worked up by hand out of sheet metal, and they have also been cast in halves and whole pieces.

It is desirable that the metal of the trap be of the dense and homogeneous character peculiar to sheet-lead; but traps made by hand from sheet-lead are expensive, and they are frequently imperfect from the metal being injured during the process of hammering or working up of the traps to shape. Cast-lead traps are more or less porous, and allow moisture to sweat through them, and, if there are air-holes in the castings, the traps are liable to leak.

My invention relates to a mode or process of manufacturing sheet-metal traps. The lead is first made into the form of a semi-cylindrical trough. This is done by a hydraulic press and a die of the shape to form such trough. The lead trough is then bent into the S or trap shape between dies. By these two successive operations, the trap is rendered more uniform in density and thickness than in traps that are made from a flat sheet of lead, and considerable saving is effected, because there is little or no waste of metal, and but little time is consumed in cutting the troughs into lengths, and the rolling operation in making the sheet metal is avoided.

In the drawing, Figure 1 is a cross-section of the trough-shaped piece made by the hydraulic press and die. Fig. 2 is a sectional view, representing the "coaxing" die or press for partially shaping the half-trap. Fig. 3 represents, by a section, the die or press for completing the half-trap. Fig. 4 is a cross-section at the line *x x*, Fig. 3; and Fig. 5 is an elevation of the trap complete, part being in section to show the trap-screw.

The hydraulic press for making the trough-shaped or semicircular piece of lead *e* (shown in Fig. 1) may be of the character used for making lead pipe, and the die through which the metal is forced should be shaped to produce the ribs or flanges 1 1 at the edges of the trough. The strip of lead, after coming from the hydraulic press, is cut up into proper lengths, and they are then ready for the first operation of shaping by the coaxing die or press. This coaxing die or press is made with a female die, *a*, and male die or plunger, *b*. A roller is provided at *c* to relieve the friction as the trough-shaped piece of lead is pressed into the die by the plunger *b*, and the shape thus given to the piece of lead approximates to the S shape of the trap. A second friction-roller may be used, as indicated by dotted lines in Fig. 2. The piece of lead is now brought to the proper shape by the dies *a′ b′*, (shown in Figs. 3 and 4,) which are similar to those above described, except that they are shaped to give the exact form to the half-trap, and to produce the sharp angles and edges to the ribs 1 1, as shown in Fig. 4. The half-traps thus made are set together and secured to each other by solder, or by melting the metal at the edges of the ribs 1 1, and the finished trap has the appearance represented in Fig. 5.

Before securing the half-traps together, a circular opening is made in the bend, and the edges of the metal bent outward to form a slight flange to receive the screw-thimble *h*, around which a ring of lead had been previously cast or attached, and this thimble is secured to the trap by soldering, or by melting the metal of the lead ring and trap and spreading the metal so as to make the inner surface of the trap smooth at this place. The thimble *h* is made with a screw-thread to receive the trap-screw *i*, which has a closed inner end, so that when the screw is in place its inner surface conforms to the interior of the trap; and there is no hollow or pocket in said screw in which filth can accumulate, as in the trap-screws heretofore made.

I claim as my invention—

The method herein specified of manufacturing lead traps, by first forming a semi-cylindrical trough by forcing the metal, while heated, through a correspondingly-shaped die in a hydraulic press, and then bending up such trough to shape by dies, substantially as set forth.

Signed by me this 6th day of November, A. D. 1873.

FRANK B. LAWRENCE.

Witnesses:
GEO. T. PINCKNEY,
CHAS. H. SMITH.